(12) United States Patent
Sikora et al.

(10) Patent No.: US 8,215,143 B2
(45) Date of Patent: Jul. 10, 2012

(54) METHOD FOR DETERMINING SHAPE CHANGES OF A WORKPIECE

(75) Inventors: Sascha Sikora, Lünen (DE); Karl-Heinz Möller, Wiehl (DE); Thomas Struppek, Werne (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 0 days.

(21) Appl. No.: 13/085,659

(22) Filed: Apr. 13, 2011

(65) Prior Publication Data

US 2011/0219836 A1    Sep. 15, 2011

Related U.S. Application Data

(63) Continuation of application No. PCT/EP2009/063114, filed on Oct. 8, 2009.

(30) Foreign Application Priority Data

Oct. 13, 2008    (DE) .......................... 10 2008 037 442

(51) Int. Cl.
 *B21C 51/00* (2006.01)
(52) U.S. Cl. ............... 72/31.01; 72/47; 72/46; 72/342.5
(58) Field of Classification Search ................ 72/46, 47, 72/342.2, 342.6, 7.1, 7.2, 7.3, 7.4, 7.5, 7.6, 72/8.1, 8.2, 8.3, 8.4, 8.5, 8.6, 8.8, 8.9, 9.1, 72/9.2, 9.3, 9.4, 9.5, 10.1, 10.2, 10.3, 10.4, 72/10.5, 10.6, 10.7, 10.8, 10.9, 11.1, 11.2, 72/11.3, 11.4, 11.5, 11.6, 11.7, 11.8, 11.9, 72/12.1, 12.2, 12.3; 428/640
See application file for complete search history.

(56) References Cited

U.S. PATENT DOCUMENTS

| | | | | |
|---|---|---|---|---|
| 2,428,318 A * | 9/1947 | Nachtman | ...................... | 205/138 |
| 2,534,141 A * | 12/1950 | Morrill et al. | ................. | 148/111 |
| 2,697,869 A * | 12/1954 | Kingston et al. | .............. | 148/531 |
| 2,869,227 A * | 1/1959 | Bradstreet | ...................... | 29/424 |
| 3,295,346 A * | 1/1967 | Bomberger, Jr. | .................. | 72/41 |
| 3,340,026 A * | 9/1967 | Kiwak | .......................... | 428/545 |
| 3,461,000 A * | 8/1969 | Nickola et al. | ................. | 148/287 |
| 3,975,165 A * | 8/1976 | Elbert et al. | ................... | 428/550 |
| 4,974,540 A * | 12/1990 | Loslever | ......................... | 118/223 |
| 5,062,284 A * | 11/1991 | Kubo et al. | ........................ | 72/46 |
| 5,140,835 A * | 8/1992 | Stransky | ........................... | 72/46 |
| 5,660,962 A * | 8/1997 | Malhotra et al. | ................. | 430/97 |
| RE35,625 E * | 10/1997 | Roberts | ........................ | 427/376.2 |
| 5,795,927 A * | 8/1998 | Decker et al. | ................. | 523/401 |
| 5,989,455 A * | 11/1999 | Hisamune et al. | ..... | 252/301.4 R |
| 6,564,604 B2 * | 5/2003 | Kefferstein et al. | .............. | 72/47 |
| 7,938,949 B2 * | 5/2011 | Brandstatter et al. | ......... | 205/245 |
| 2009/0297878 A1 * | 12/2009 | Chang et al. | ................... | 428/640 |
| 2010/0055350 A1 * | 3/2010 | Pfenninger et al. | ........... | 427/581 |
| 2010/0136269 A1 * | 6/2010 | Andersen et al. | ............ | 428/34.4 |
| 2010/0150791 A1 * | 6/2010 | Kunze et al. | ................... | 422/179 |
| 2010/0248334 A1 * | 9/2010 | McDaniel | .................. | 435/262.5 |

FOREIGN PATENT DOCUMENTS

| | | |
|---|---|---|
| DE | 218 864 A1 | 2/1985 |
| JP | 2001104670 A | 4/2001 |

OTHER PUBLICATIONS

Dorian Garcia, Jean-Jose Orteu; 3D Deformation Measurement Using Stereo-Correlation Applied to Experimental Mechanics; The 10th FIG International Symposium on Deformation Measurements; Mar. 19-22, 2001; pp. 50-60; Orange, California, USA.

\* cited by examiner

*Primary Examiner* — Edward Tolan
*Assistant Examiner* — Lawrence J Averick
(74) *Attorney, Agent, or Firm* — Reinhart Boerner Van Deuren P.C.

(57) ABSTRACT

The invention relates to a method for determining shape changes of a workpiece made of steel or a steel alloy due to forming, in which a varnish is applied to the workpiece, the workpiece is formed and then an optical shape change analysis is carried out by measuring the applied varnish. The object of providing a method for determining shape changes of a workpiece made of steel or a steel alloy, said method also being suitable for analyzing the shape change of a workpiece after hot forming, is solved according to the teaching of the present invention in that before the forming of the workpiece a varnish with an Al proportion of more than 30% by weight is applied to the workpiece, the workpiece is heated for forming to a hot forming temperature and the workpiece is cooled after or during the forming.

15 Claims, No Drawings

METHOD FOR DETERMINING SHAPE CHANGES OF A WORKPIECE

CROSS-REFERENCE TO RELATED PATENT APPLICATIONS

This patent application is a continuation of pending PCT/EP2009/063114, filed Oct. 8, 2009, which claims the benefit of German Application No. 10 2008 037 442.3, filed Oct. 13, 2008, the entire teachings and disclosure of which are incorporated herein by reference thereto.

FIELD OF THE INVENTION

The invention relates to a method for determining shape changes of a workpiece made of steel or a steel alloy due to forming, in which a varnish is applied to the workpiece, the workpiece is formed and then an optical shape change analysis is carried out by measuring the applied varnish.

BACKGROUND OF THE INVENTION

The determination of the shape change of workpieces after forming processes is an important analysis to optimise the forming processes. In particular, strong, local loads of the formed material, for example if locally large forming processes occur, may be ascertained and optionally eliminated. Different methods are used to analyse the forming processes. For example, it is known to introduce structures, which are optically analysed before and after the forming, by applying gridlines, screens or dot screens of colour or corresponding etchings of the surface of the workpieces to be formed, so that the corresponding degrees of forming can be measured and shown. Moreover, it is known from the German patent specification DD 218 864 to print a varnish film with contours, shapes, measuring meshworks or figures on metallic or non-metallic material surfaces and to measure these after a corresponding forming of the workpiece. The increasing use of higher-strength or, respectively, highest-strength steels or steel alloys, for example to achieve weight savings, but also to achieve higher strengths, frequently requires the use of hot forming of the workpieces to provide necessary degrees of forming. During hot forming, the workpiece consisting of a steel or a steel alloy is heated to a hot forming temperature above 850° C. and formed in this state. During or immediately after the forming, the workpiece is greatly cooled, so that high-strength structures are produced. It has been found that during hot forming, the previously used possibilities for shape change analysis cannot be used. Owing to the high temperatures during the hot forming, neither the application of an electrolyte nor the application of previously provided colours are a possibility for allowing a shape change analysis, as the contrasts necessary for optical analysis of the shape change no longer existed in the previously known methods after hot forming.

The present invention is therefore based on the object of providing a method for determining shape changes of a workpiece made of steel or a steel alloy, which is also suitable for the shape change analysis of a workpiece after hot forming.

SUMMARY OF THE INVENTION

The object presented above is achieved according to the teaching of the present invention in that before the forming of the workpiece a varnish with an Al proportion of more than 30% by weight is applied to the workpiece, the workpiece is heated for forming to a hot forming temperature and the workpiece is cooled after or during the forming.

DETAILED DESCRIPTION OF THE INVENTION

It has been shown that the use of varnishes with an aluminium proportion of more than 30% by weight provides a contrast necessary for the shape change analysis even after a hot forming, so hot-formed workpieces can also be subjected to a shape change analysis. It is assumed that because of the high aluminium proportion, the varnish remains on the workpiece without flaking off and can then be analysed. Good results with regard to the use of the varnish on a workpiece which is hot-formed are achieved with Al proportions of between 35% by weight and 55% by weight.

A further improvement with regard to carrying out a shape change analysis is achieved in that according to a first embodiment of the method according to the invention, the varnish is applied to the workpiece using a screen printing method or using a printing stamp. In both methods, a maximum covering power of the varnish can be achieved. The precision of the pattern on application is also very great. Moreover, varnish layers that are as homogeneous as possible, which can be uniformly applied to the workpiece, arise in both methods. As a result, the precision of the shape change analysis is further increased.

According to a further embodiment of the method according to the invention, a white varnish is used. The white varnish produces a particularly good contrast for optical measuring techniques, which require as high a contrast as possible with respect to the workpiece surface. It is, of course, also conceivable to use a light colour provided with high white proportions to achieve the same effect.

If, according to a next embodiment of the method according to the invention, screen dots and/or gridlines are applied to the workpiece, a surface-covering shape change analysis can take place after the hot forming. The screen dots may, for example, also be specifically adapted to the shape change regions and yield a simple possibility, for example, by measuring the spacing of the gridlines or the screen dots for measuring the shape change.

Finally, the method according to the invention is further improved in that before the hot forming, the workpiece is heated to a temperature of more than 850° C., preferably to 880° C. to 980° C. This corresponds to the range of hot forming temperatures generally used for higher-strength or highest-strength steels. Despite the forming of the workpiece at high temperatures of such an extent, it has been found that, in conjunction with the varnish used according to the invention, the contrasts necessary for the optical shape change analysis are retained on the workpiece.

There are now a large number of possibilities for developing and configuring the method according to the invention. Reference is made here, on the one hand, to the claims following claim 1 and, on the other hand, to the description of an exemplary embodiment.

Investigations were carried out on a workpiece which was hot-formed. Before the hot forming, the workpiece was printed with a varnish using a screen printing method, the varnish having the following proportions in % by weight:
Al approx. 45%,
Si approx. 5%,
S approx. 2.5%,
V approx. 5%,
Ba approx. 10%.

The workpiece was heated to 900° C. and formed in the tool at this temperature and immediately greatly cooled. After the hot forming, a very clear contrast continued to show on the workpiece, so that the shape change of the workpiece could be measured with the aid of optical measuring instruments. The good properties of the varnish with regard to the temperature resistance and, in particular, the resistance to hot forming processes are attributed to the aluminium proportion, which is alloyed in the material. It is assumed that the fact that the varnish according to the invention does not flake off is due to the aluminium proportion. The shape change analysis of workpieces which are hot-formed is, above all, important in the production of formed parts made of higher-strength or highest-strength steels, which, without hot forming, do not achieve the necessary degrees of forming. Using the method according to the invention, there is therefore the possibility of analysing correspondingly well hot forming previously not accessible to shape change analysis.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. Method for determining shape changes of a workpiece made of steel due to forming, the method comprising:
    applying a varnish with an Al proportion of more than 30% by weight to the workpiece before the forming of the workpiece;
    heating the workpiece for forming to a hot forming temperature;
    cooling the workpiece after or during forming; and
    after the workpiece is formed, an optical shape change analysis is carried out by measuring the applied varnish.

2. Method according to claim 1, wherein the varnish is applied to the workpiece using a screen printing method.

3. Method according to claim 1, wherein a white varnish is used.

4. Method according to claim 1, wherein screen dots are applied to the workpiece.

5. Method according to claim 1, wherein before the hot forming, the workpiece is heated to a temperature of more than 850° C., preferably to 880° C. to 980° C.

6. Method according to claim 1, wherein the varnish is applied to the workpiece using a printing stamp.

7. Method according to claim 2, wherein a white varnish is used.

8. Method according to claim 2, wherein screen dots are applied to the workpiece.

9. Method according to claim 3, wherein screen dots are applied to the workpiece.

10. Method according to claim 1, wherein gridlines are applied to the workpiece.

11. Method according to claim 2, wherein gridlines are applied to the workpiece.

12. Method according to claim 3, wherein gridlines are applied to the workpiece.

13. Method according to claim 2, wherein before the hot forming, the workpiece is heated to a temperature of more than 850° C., preferably to 880° C. to 980° C.

14. Method according to claim 3, wherein before the hot forming, the workpiece is heated to a temperature of more than 850° C., preferably to 880° C. to 980° C.

15. Method according to claim 4, wherein before the hot forming, the workpiece is heated to a temperature of more than 850° C., preferably to 880° C. to 980° C.

* * * * *